(12) United States Patent
Gillis et al.

(10) Patent No.: US 8,961,062 B2
(45) Date of Patent: Feb. 24, 2015

(54) INERTIAL LOCKOUT MECHANISM

(75) Inventors: Francis Raymond Gillis, Farmington Hills, MI (US); Raymond Anthony Oldani, Canton, MI (US); Bill Garrett Vernon, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 13/535,542

(22) Filed: Jun. 28, 2012

(65) Prior Publication Data

US 2014/0003864 A1    Jan. 2, 2014

(51) Int. Cl.
*F16B 21/00*        (2006.01)

(52) U.S. Cl.
USPC ............ 403/327; 403/325; 292/163; 292/183

(58) Field of Classification Search
CPC ......... E05B 77/06; E05B 77/12; E05B 83/30; Y10S 292/22
USPC .............. 403/321, 322.1, 325, 326, 327, 330; 292/137, 138, 163, 174, 175, DIG. 22; 296/24.34, 37.8, 37.13; 267/240
See application file for complete search history.

(56) References Cited

U.S. PATENT DOCUMENTS

| | | | |
|---|---|---|---|
| 5,427,447 A * | 6/1995 | Satoh ............................ 312/309 |
| 5,503,037 A * | 4/1996 | Ruelein et al. ...................... 74/2 |
| 5,524,944 A * | 6/1996 | Berg ............................. 292/163 |
| 5,649,684 A * | 7/1997 | Denis et al. ................. 248/503.1 |
| 5,690,371 A * | 11/1997 | Turnbull ........................ 292/163 |
| 6,036,239 A * | 3/2000 | Hammersley .................. 292/158 |
| 6,733,049 B2 * | 5/2004 | Piorkowski et al. ........... 292/139 |
| 6,991,272 B2 * | 1/2006 | Kalsi .......................... 292/336.3 |
| 7,083,205 B2 * | 8/2006 | Hall ............................... 292/34 |
| 7,329,164 B2 * | 2/2008 | Bermal ........................... 441/42 |
| 7,481,468 B2 * | 1/2009 | Merideth et al. .............. 292/137 |
| 7,607,703 B2 * | 10/2009 | Cho ............................... 292/304 |
| 7,635,151 B2 * | 12/2009 | Rodawold et al. ........... 292/336.3 |
| 7,806,446 B2 * | 10/2010 | Oh ................................. 292/165 |
| 7,857,242 B2 * | 12/2010 | Huang ........................... 239/600 |
| 2004/0201238 A1 | 10/2004 | Griggs, Jr. et al. |
| 2005/0156433 A1 * | 7/2005 | Nemoto et al. ............... 292/163 |
| 2006/0261602 A1 * | 11/2006 | Jankowski et al. ........... 292/216 |
| 2007/0085349 A1 * | 4/2007 | Merideth et al. .............. 292/183 |
| 2008/0129101 A1 | 6/2008 | Park |
| 2009/0218842 A1 | 9/2009 | Muller |
| 2010/0001539 A1 | 1/2010 | Kikuchi et al. |
| 2011/0148168 A1 * | 6/2011 | Chen ............................. 297/364 |

\* cited by examiner

*Primary Examiner* — Daniel P Stodola
*Assistant Examiner* — Jonathan Masinick
(74) *Attorney, Agent, or Firm* — Vichit Chea; Price Heneveld LLP

(57) ABSTRACT

An inertial lockout mechanism is coupled to a latch mechanism, such that, during a collision event, the inertial lockout mechanism will move to an interference position such that the latch mechanism will be retained in a locked position as an inertial force is realized on the latch mechanism. Specifically tailored compression spring configurations ensure that the inertial lockout mechanism will move to the interference position before the latch mechanism can move to the unlocked position.

16 Claims, 5 Drawing Sheets

INERTIAL LOCKOUT MECHANISM

FIELD OF THE INVENTION

The present invention generally relates to a lockout mechanism for use in conjunction with a console armrest latch, and more specifically, to an inertial lockout mechanism configured to retain a console armrest latch in a locked position during a collision event.

BACKGROUND OF THE INVENTION

Console covers or lids, as disposed in vehicle interiors, are generally adapted to open and close by the actuation of a latch mechanism by the vehicle user. However, a console cover can unlock under the force of inertia during a collision event such that the console cover opens making for a potentially dangerous environment for the vehicle occupants, wherein items stored in the console can project through the vehicle interior during a collision event. The present invention is adapted to retain the console cover in a locked position during a collision event.

SUMMARY OF THE INVENTION

One aspect of the present invention includes a locking device for an armrest, having a latch mechanism which is disposed within an armrest housing. The latch mechanism includes a latch pawl operable between a locked position and an unlocked position. A first compression spring is adept to bias the latch pawl to the locked position when at rest. The latch pawl can be actuated through an unlocked position by the vehicle user actuating the latch paddle that moves the latch pawl to the unlocked position. A catch mechanism is pivotably coupled to the armrest housing and is operable between an interference position and a noninterference position. When in the interference position, the catch mechanism engages and retains the latch pawl in the locked position. When in the noninterference position, the catch mechanism is disengaged from the latch pawl such that the latch pawl, when at rest, remains bias towards the locked position by the first compression spring. A second compression spring is coupled to the armrest housing and is adapted to bias the catch mechanism to the noninterference position. The first compression spring and the second compression spring have associated compression stiffnesses wherein the compression stiffness of the second compression spring is less than the compression stiffness of the first compression spring. The compression stiffness of the second compression spring is configured to be overcome by the force of inertia during a collision event, such that the catch mechanism disengages with the second compression spring and pivots to the interference position.

Another aspect of the present invention includes a locking device for an armrest comprising a latch mechanism having a latch pawl which is operable between locked and unlocked positions. A catch mechanism is disposed adjacent the latch mechanism, and the catch mechanism is operable between an interference position and a noninterference position. In the interference position, the catch mechanism engages and retains the latch pawl in the locked position, and in the noninterference position, the catch mechanism is not engaged with the latch pawl. The catch mechanism is adapted to move to the interference position for engagement with the latch pawl under the force of inertia during a collision event.

Yet another aspect of the present invention includes a locking device for an armrest comprising a latch mechanism having a latch pawl, wherein the latch pawl is operable between locked and unlocked positions. An inertial lockout mechanism is disposed above the latch mechanism comprising a rocker mechanism. The rocker mechanism is pivotably coupled to an armrest housing, and the rocker mechanism is gravitationally predisposed to an interference position. In the interference position, the rocker mechanism engages and retains the latch pawl in the locked position. A compression spring is adapted to bias the rocker mechanism to a noninterference position when at rest. The compression spring is configured to be overcome by the force of inertia during a collision event such that the rocker mechanism gravitationally pivots to the interference position for engagement with the latch pawl.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
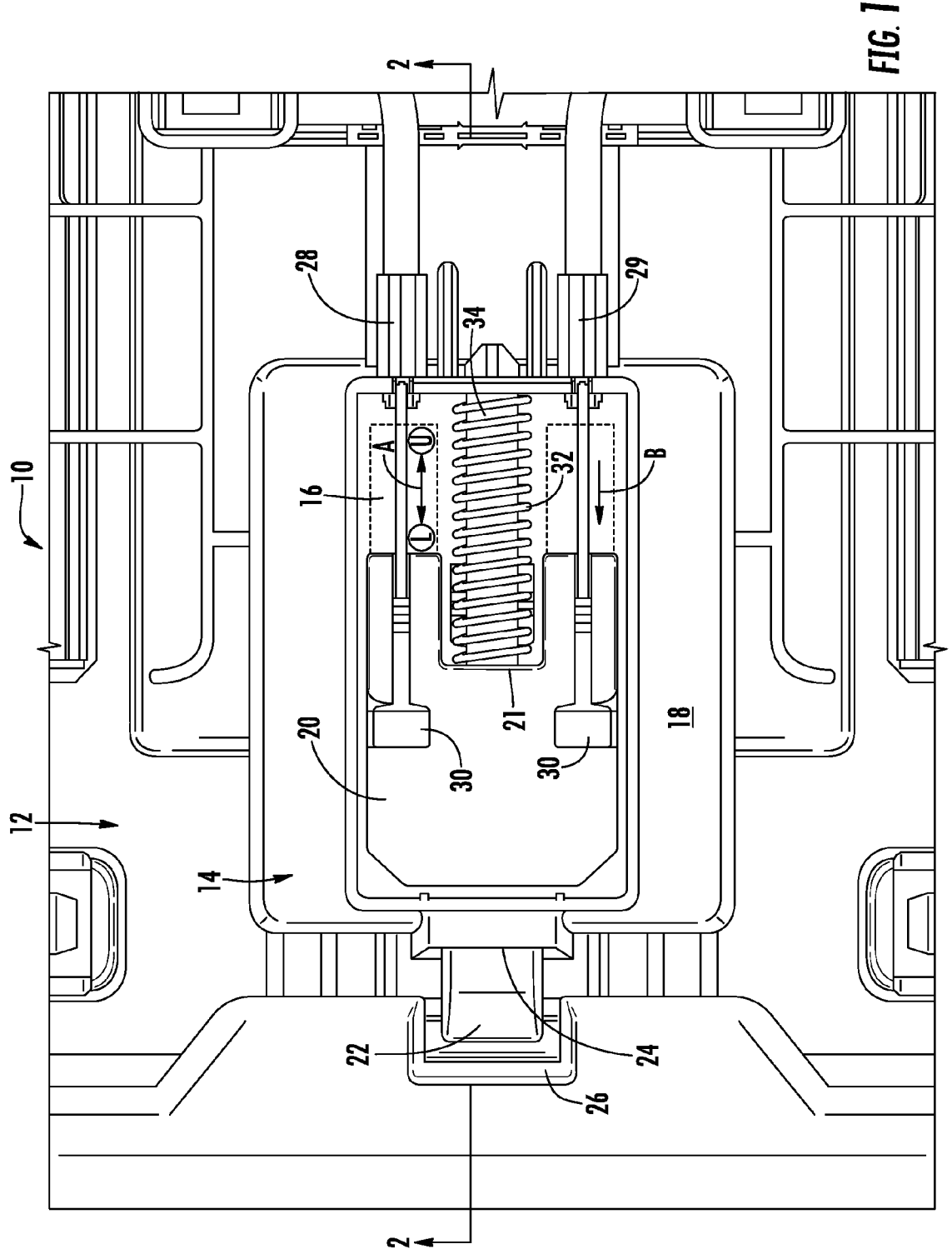
FIG. 1 is a fragmentary bottom plan view of a latch mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, the reference numeral 10 generally designates a cover for a vehicle console or armrest, which is generally disposed in the center of a vehicle interior between the driver-side and passenger-side seats. The armrest cover 10 includes an armrest housing 12 having a latch mechanism 14. In FIG. 1, the underside of the armrest cover 10 is shown with the armrest housing 12 having the latch mechanism 14 disposed centrally with respect to the armrest housing 12. The latch mechanism 14 comprises a channel 16 disposed on an armrest base plate 18. The channel 16 of the latch mechanism 14 has disposed therein a latch pawl 20 having a latch 22 which extends outwardly from an aperture 24 disposed in a car-forward position on the latch mechanism 14. As shown in FIG. 1, the armrest cover 10 is in a locked position with the latch 22 of the latch pawl 20 engaged with a bin striker 26 such that in this locked position the latch pawl 20 keeps the armrest cover 10 closed until the latch pawl 20 is retracted using one or more paddle actuators disposed on an exterior of the armrest cover 10. Thus, the latch mechanism 14 can be actuated between a locked position "L" wherein the latch pawl 20 is disposed in a car-forward position, and an unlocked position "U" wherein the latch pawl 20 is in a car-rearward position, such that the latch 22 is disengaged from the bin striker 26, thereby allowing the vehicle occupant to open the console by lifting the armrest cover 10. As shown in FIG. 1, the latch pawl 20 is moved laterally within the channel 16 of the latch mechanism 14 in a direction indicated by arrow A. Pull cable assemblies 28 and 29 are operably coupled to the latch mechanism 14, and specifically, cable ends 30 are coupled to the latch pawl 20 and either pull cable assembly 28 or 29 can be actuated by a vehicle occupant when a dual actuation mechanism is used with the latch assembly 14 wherein actuators are disposed on both the driver-side and passenger-side of the armrest cover 10.

A compression spring 32 is disposed on a compression spring housing 34. The compression spring 32 is disposed between and abuts the rear wall of the latch pawl 20 and a rear wall 17 of the channel 16. The compression spring 32 biases the latch pawl 20 into the locked position "L" with a car-forward spring force or compression stiffness indicated by arrow B. In this way, the compression spring 32 keeps the latch 22 of the latch pawl 20 in contact with the bin striker 26 until the latch mechanism 14 is actuated by the pull cable assemblies 28, 29 thereby overcoming the spring stiffness B to move the latch pawl 20 to the unlock position "U".

Figure 2:
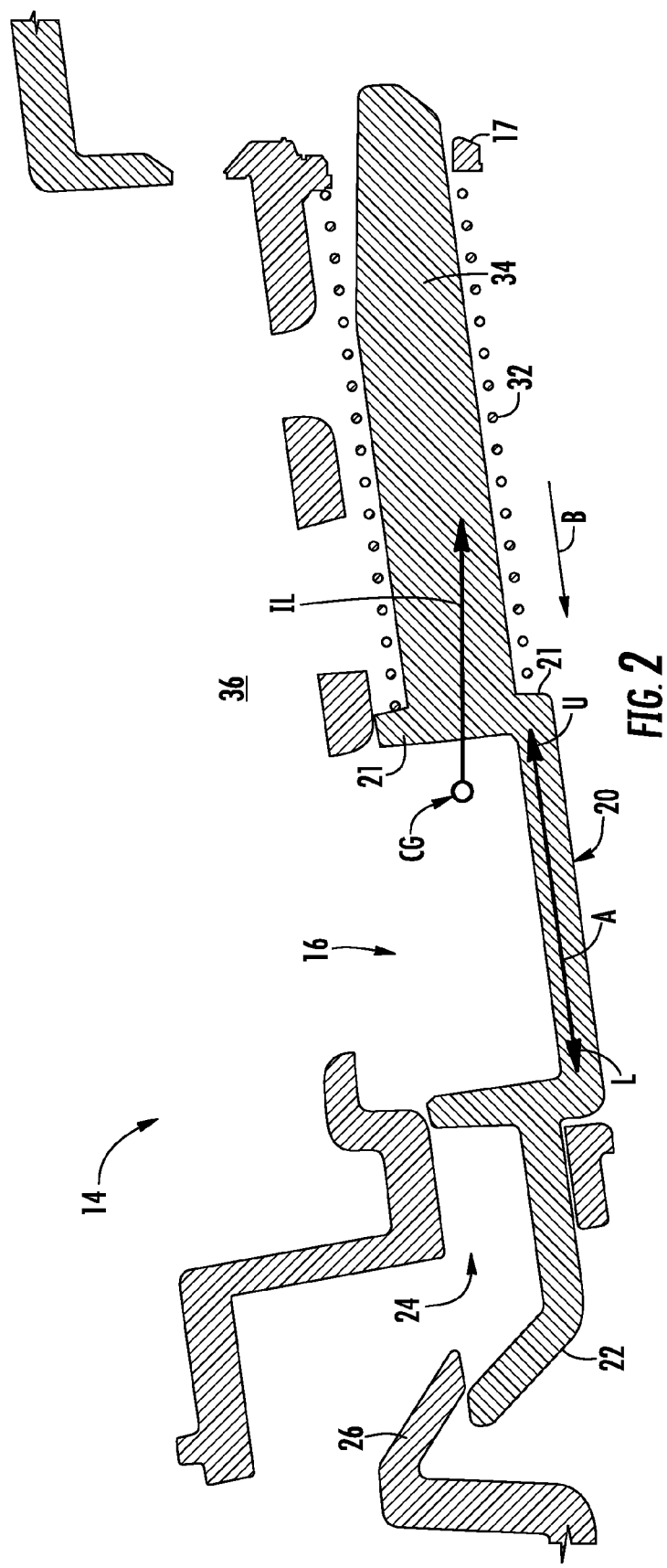
FIG. 2 is a fragmentary cross-sectional side elevational view of the latch mechanism of FIG. 1 taken along line 2 (FIG. 1)

Referring now to FIG. 2, the latch pawl 20 is shown in the latched position wherein the latch 22 of the latch pawl 20 is engaged with the bin striker 26 of the console to keep the armrest cover 10 closed. As indicated by arrow A, the latch pawl 20 actuates in a fore and aft linear direction between a locked position "L" and an unlocked position "U". The compression spring 32 is shown disposed on the compression spring housing 34, which is in the form of a rod-shaped housing. As noted above, the compression spring 32 abuts a rear wall 21 of the latch pawl 20 and a real wall 17 of the channel 16. In this way, the compression spring 32 biases the latch pawl 20 in a car-forward or latched position "L" by biasing the latch pawl 20 with a compression stiffness or spring force applied to the latch pawl 20 in a direction as indicated by arrow B. The compression stiffness of the compression spring 32 is again overcome when a vehicle occupant actuates an actuation mechanism which retracts the latch 22 of the latch pawl 20 from the bin striker 26 thereby overcoming the compression stiffness B of a compression spring 32 to move the latch pawl 20 to the unlocked position "U" to open the armrest cover 10. The present invention is designed to keep the latch 22 of the latch pawl 20 in engagement with the bin striker 26 in the event of an inertial load being realized on a vehicle due to a rear-end collision event. The center of gravity of the latch pawl 20 is indicated in FIG. 2 as "CG". An inertial load, as indicated by arrow "IL", is realized on the latch mechanism 14 in a car-rearward direction as brought about during a rear-end collision event. The inertial load is equal to the mass of the latch pawl 20 times the acceleration realized on the latch pawl 20 due to the rear-end collision event. An inertial load of a large enough magnitude acting on the center of gravity of the latch pawl 20 in a car-rearward direction can generate a large enough force to overcome the spring force or compression stiffness B generated by the compression spring 32, such that the latch pawl 20 would move in a rearward direction which would cause a disengagement of the latch 22 of the latch pawl 20 from the bin striker 26, such that the armrest cover 10 would be in an open or unlocked position "U". During such a rear-end collision event, the armrest cover 10 could open and the contents of the console can become dangerous projectiles within the vehicle interior such that there is a desire to keep the latch pawl 20 in the locked position "L" during such a rear-end collision event. As shown on FIG. 2, the latch mechanism 14 further comprises an upper housing area 36 for housing an inertial lockout mechanism 40, as shown in FIGS. 3-5 and further described below.

Figure 3:
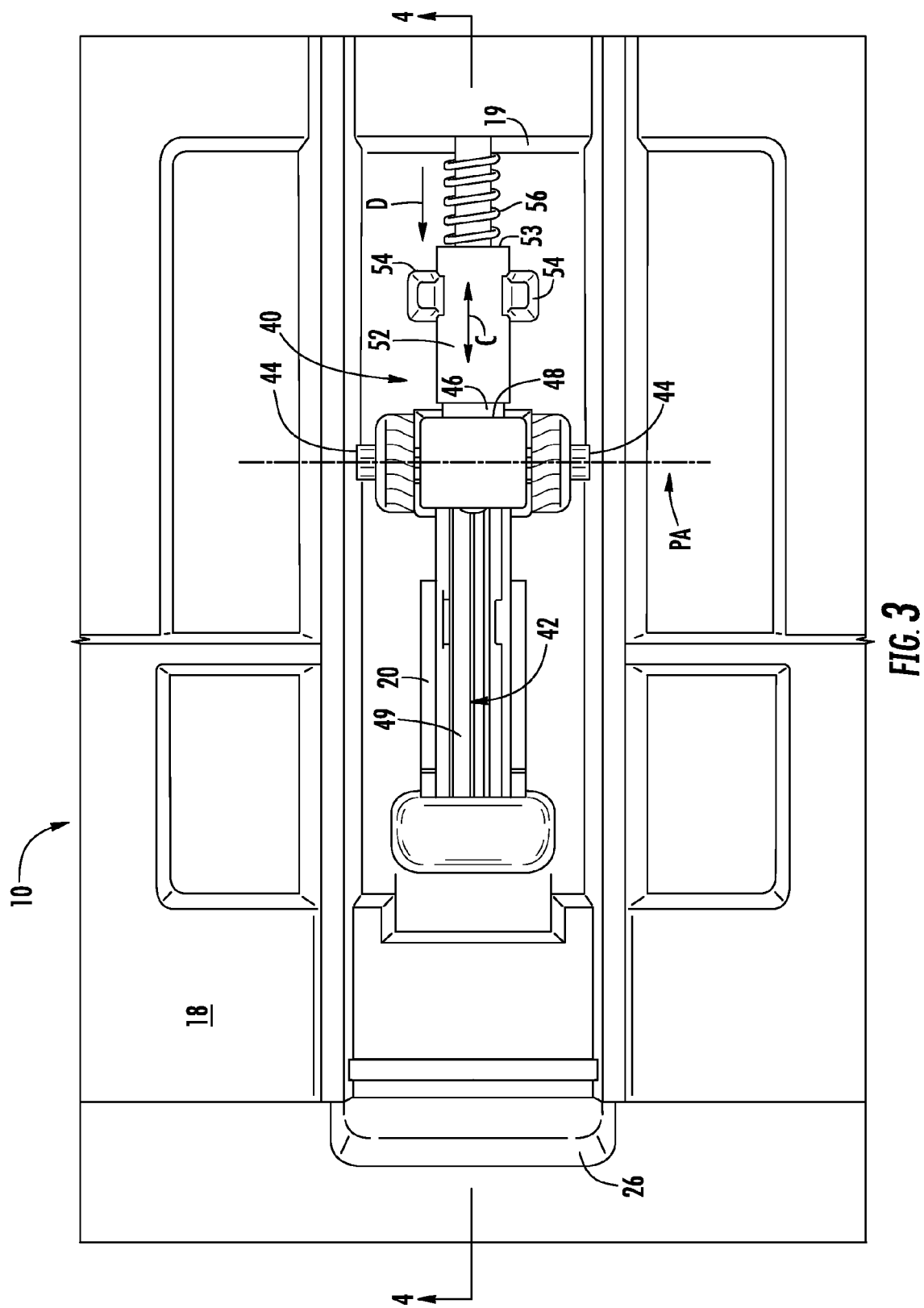
FIG. 3 is a fragmentary top plan view of an inertial lockout mechanism.

Referring now to FIG. 3, an inertial lockout mechanism 40 is shown disposed in the upper housing area 36 (FIG. 2) of the armrest cover 10. The inertial lockout mechanism 40 comprises a rocker assembly or catch mechanism 42 which is pivotably coupled at pivot points 44 of the armrest base plate 18. The catch mechanism 42 can be pivoted about a pivot axis as indicated by line PA in FIG. 3. The catch mechanism 42 further comprises an abutment member 46 disposed on a car-rearward end 48 (FIG. 4) of the catch mechanism 42. On the car-forward end 49 of the catch mechanism 42, a second abutment portion 50 (FIG. 4) is disposed. An actuator 52 is disposed in a car-rearward location relative to the catch mechanism 42 and is held in place on the armrest base plate 18 by actuator couplings 54. The actuator 52 is movable between fore and aft positions along a linear axis of movement indicated by arrow C. As shown in FIG. 4, the linear movement C of the actuator 52 is generally parallel to the fore and after linear movement of the latch pawl 20, as indicated by arrow A. A compression spring 56 is disposed on a compression spring housing 58, which extends off the car-rearward end 48 of the actuator 52 in the form of a compression spring housing rod 58. The compression spring 56 is disposed on the compression spring housing rod 58 and abuts a car-rearward portion 53 of the actuator 52 and a wall 19 of the armrest base plate 18. In this way, the compression spring 56 biases the actuator 52 in a car-forward direction for engagement with abutment portion 46 of the catch mechanism 42. The compression spring 56 comprises a compression spring stiffness which produces the biasing force indicated by arrow D.

Figure 4:
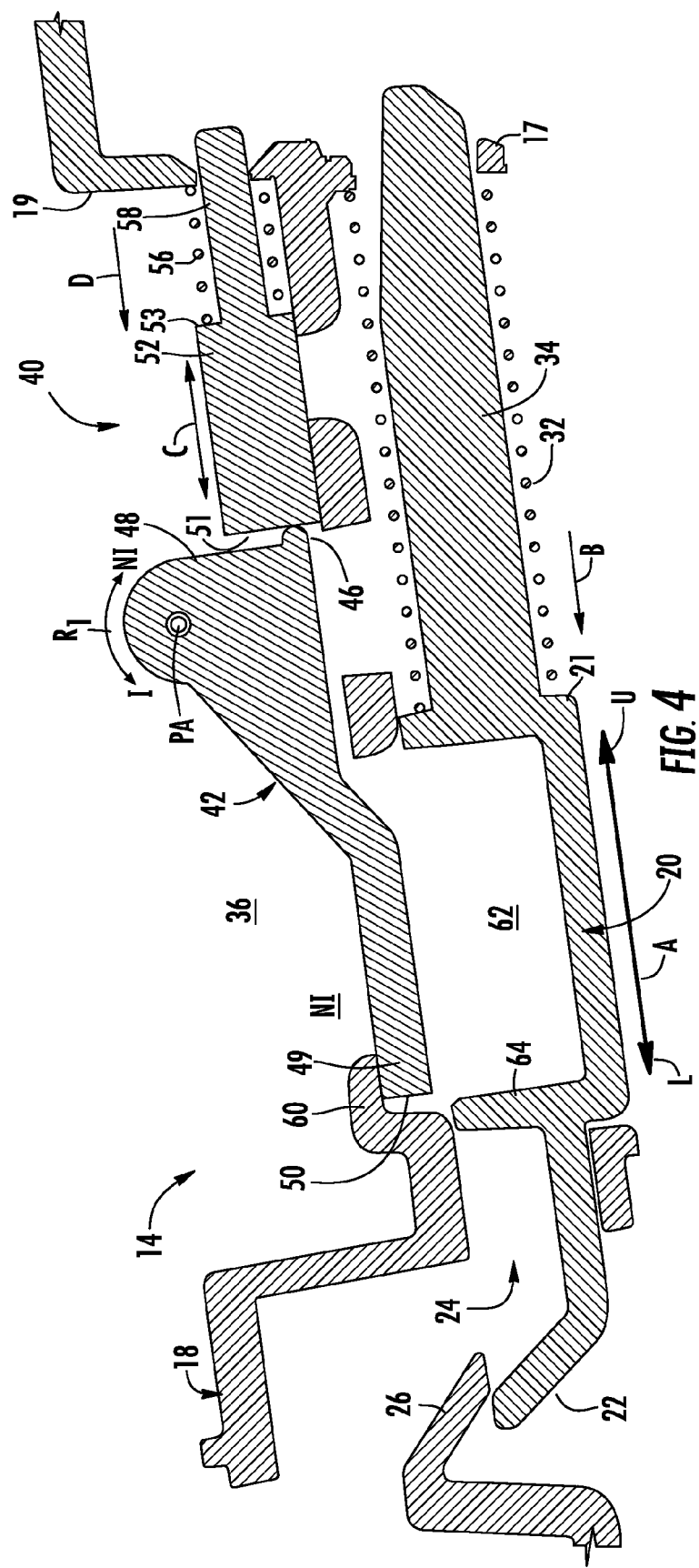
FIG. 4 is a fragmentary cross-sectional side elevational view of a latch mechanism of the present invention in a nominal condition.
Figure 5:
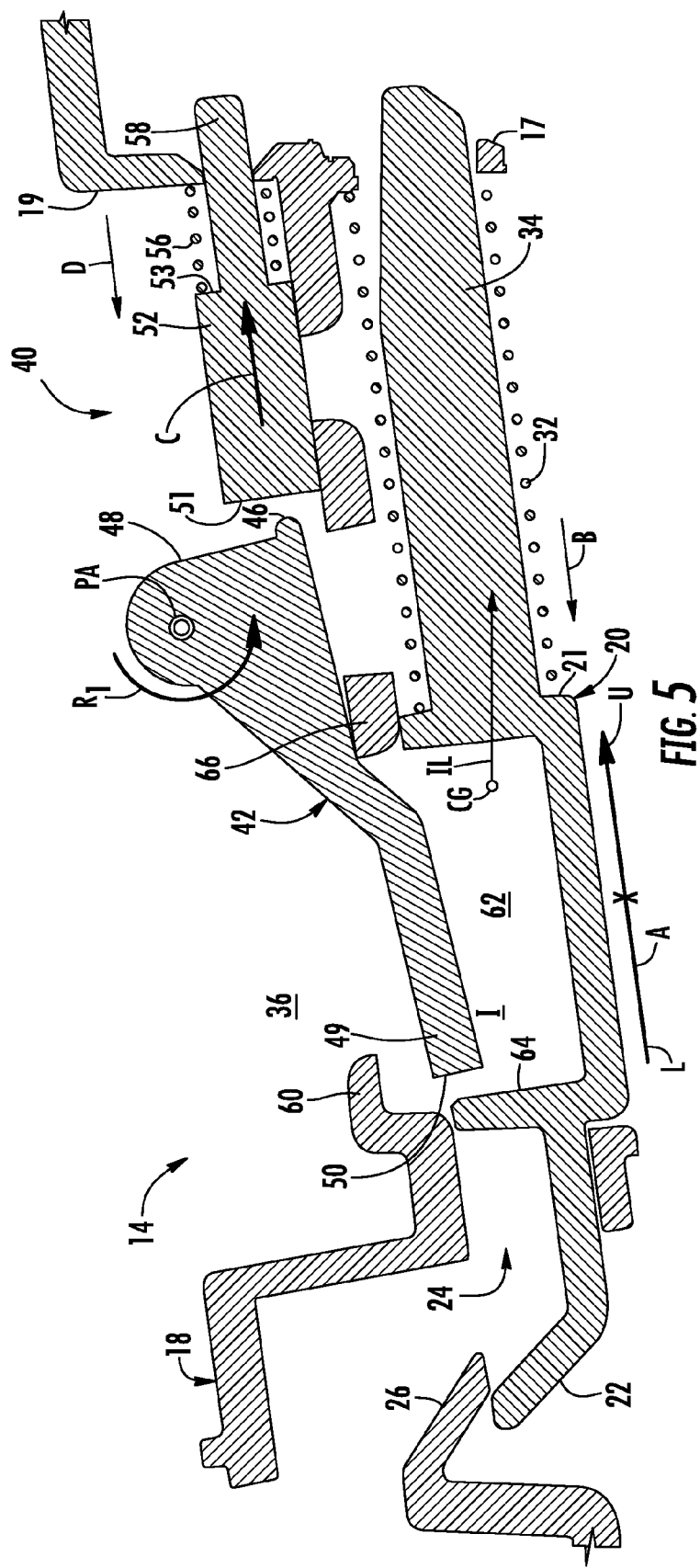
FIG. 5 is a fragmentary cross-sectional view of the latch mechanism of FIG. 4 taken along line 4 (FIG. 3) during a collision event.

Referring now to FIGS. 4 and 5, the inertial lockout mechanism 40 is shown disposed adjacent and above the latch pawl 20. The inertial lockout mechanism 40 is shown in FIG. 4 with the catch mechanism 42 disposed in a noninterference position wherein the car-forward end 49 of the rocker mechanism 42 abuts an abutment plate 60 as disposed on the armrest base plate 18. In the noninterference position, indicated as position "NI" in FIG. 4, the latch pawl 20 is free to move in fore and aft positions between the locked position "L" and the unlocked position "U" along a lateral access of movement indicated by arrow A. Thus, in the noninterference position "NI", the catch mechanism 42 is essentially invisible to the latch pawl 20 and does not interfere with latch pawl actuation. As further shown in FIG. 4, the rocker 42 can be pivoted about a pivot access "PA" along a rotational line of movement indicated by arrow $R_1$. The rocker 42 can rotate along the rotational access of movement $R_1$ between the noninterference position "NI" (FIG. 4) and an interference position "I", as shown in FIG. 5. As noted above, in a nominal condition, as shown in FIG. 4, the rocker 40 is in the noninterference position "NI" wherein the car-forward end 49 of the rocker 42 abuts abutment plate or rocker stop 60 disposed on the armrest base plate 18. The rocker 42 is biased towards the noninterference position by the car-forward force D provided by compression spring 56 acting on actuator 52. In this way, car-forward abutment surface 51 engages a first abutment portion 46 on the car-rearward end 48 of the catch mechanism 42. Thus, the actuator 52, biased in a car-forward position by compression spring 56, retains the catch mechanism 42 in a noninterference position in a nominal condition. As further shown in FIG. 4, a cavity or recess 62 is disposed on the latch pawl 20 directly below and adjacent to the car-forward end 49 of the catch mechanism 42. The cavity 62 comprises an abutment portion 64 which is engaged by the second abutment portion 50 of the catch mechanism 42 when the catch mechanism 42 is in an interference position as shown in FIG. 5.

Referring now to FIG. 5, an inertial load, indicated by arrow IL, is being realized on the latch mechanism 14 due to a rear-end collision event. Due to the inertial load, the actuator 52 has compressed the second compression spring 56 and has thus moved in a car-rearward direction as indicated by arrow C, such that abutment surface 51 is no longer engaged with abutment portion 46 of the catch mechanism 42, and thus, the actuator 52 is no longer holding the car-forward end 49 of the catch mechanism 42 against the rocker stop 60. The inertial load being realized on the center of gravity of the catch mechanism 42 generates a moment about the pivot axis "PA" such that the catch mechanism 42 rotates downwardly into the cavity 62 of the latch pawl 20 into the interference position "I". A second rocker stop 66 disposed on the armrest base plate 18 is shown in FIG. 5 as stopping the rotation of the catch mechanism 42 at a point in which the catch mechanism 42 is properly aligned with the car-forward end 49 having abutment surface 50 aligned with abutment wall 64 of the cavity 62 such that abutment surface 50 will engage abutment wall 64 as the latch pawl 20 moves towards the unlocked position "U" due to the inertial load. As the catch mechanism 42 falls into the car-rearward path of movement of the latch pawl 20, indicated by arrow A, abutment portion 50 will engagement abutment wall 64 of the cavity 62 of the latch pawl 20, thereby retaining the latch pawl 20 from moving far enough to disengage the latch 22 from the bin striker 26. In this way, the inertial lockout mechanism 40 retains the latch pawl 20 in an essentially locked position "L", such that the latch 22 remains engaged with bin striker 26, such that the armrest cover will not open as an inertial load "IL" is realized on the latch mechanism 14. While the latch pawl 20 may move slightly in the car-rearward direction before engaging the catch mechanism 42, this movement is limited such that the latch 22 will remain in a position of engagement with bin striker 26.

The compression springs 32 and 56 are designed to bias the latch pawl 20 and the actuator 52 in car-forward directions respectively. Compression spring 52 has a compression stiffness or spring force B that is associated with the compression spring 32, which biases the latch pawl 20 in the car-forward direction. Compression spring 56 has a compression stiffness B associated therewith that biases the actuator 52 in a car-forward direction. In order for the inertial lockout mechanism 40 to work as intended, the compression stiffness associated with compression spring 56 must be lower than the compression stiffness associated with compression spring 32. In this way, as an inertial load is realized on the latch mechanism 14 during a rear-end collision event, the compression spring 56, having a lower compression stiffness than compression spring 32, will be the first spring to compress as the inertial load is realized on the actuator 52 in a car-rearward direction. Thus, as compression spring 56 is predisposed with an associated compression stiffness that is less than the compression stiffness of compression spring 32, compression spring 56 will move due to a smaller inertial load as compared to the same inertial load being realized on compression spring 32. The movement of the actuator 52 in a car-rearward direction due to the inertial load, causes the catch mechanism 42, as noted above, to fall into the path of the latch pawl 20 moving towards the unlocked position "U" during a rear-end collision event.

Specifically, the mass of actuator 52, relative to the compression spring stiffness of compression spring 56, is configured so that the actuator 52 will move due to a smaller inertial load as compared to the latch pawl 20 coupled to latch pawl compression spring 32. This means that the actuator 52 will always move in a car-rearward direction before the latch pawl 20 can move to an unlocked position, regardless of the magnitude of the inertial load realized on either latch component. Once the inertial load has been removed, the inertial lockout mechanism 40 will return to its spring-biased noninterference position "NI", as shown in FIG. 4, such that the latch pawl 20 can operate as normal.

The latch mechanism 14, as shown in FIGS. 4 and 5, comprises a first compression spring 32 which biases the latch pawl 20 in a car-forward direction where the compression spring 32 has an associated compression stiffness indicated by arrow B. A second compression spring 56 of the latch mechanism 14 is adapted to bias the actuator 52 in a car-forward direction and has an associated compression stiffness as indicated by arrow D. As noted above, the compression stiffness D is less than that of the compression stiffness B such that during a rear-end collision event, actuator 52 will always move in a car-rearward direction before latch pawl 20 will move in a car-rearward direction. In this way, during a rear-end collision event, actuator 52 will always move out of engagement with the catch mechanism 42 such that the catch mechanism 42 will rotate downwardly into the path of movement of latch pawl 20 towards an unlocked position "U" such that the catch mechanism 42 retains the latch pawl 20 in an essentially locked position, wherein latch 22 engages bin striker 26 such that the armrest cover will not open during a rear-end collision event.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A latch assembly for a vehicle armrest comprising:
   a latch pawl coupled to an armrest housing and operable between a locked position and an unlocked position, the latch pawl being biased to the locked position by a first compression spring having an associated compression stiffness;
   a catch mechanism pivotally coupled to the armrest housing and operable between an interference position, wherein the catch mechanism retains the latch pawl in the locked position, and a non-interference position, wherein the catch mechanism is disengaged from the latch pawl;
   a second compression spring configured to bias the catch mechanism to the non-interference position, wherein the second compression spring has an associated compression stiffness that is less than the compression stiffness of the first compression spring; and further wherein the second compression spring is configured to compress under a lower inertial force as compared to the first compression spring during a rear-end collision event such that the catch mechanism gravitationally pivots to the interference position prior to the latch pawl moving to the unlocked position; and
   an actuator coupled to the second compression spring and moveable in a same direction as the second compression spring, the actuator being biased by the second compression spring to engage the catch mechanism, wherein the actuator disengages the catch mechanism when an inertial load is realized on the latch assembly that compresses the second compression spring, wherein the latch pawl has a recess receiving the catch mechanism when the catch mechanism is in the interference position.

2. The latch assembly of claim 1, wherein the latch pawl further comprises:
a latch disposed on a car-forward end of the latch pawl, wherein the latch is positioned to be engaged with a bin striker when the latch pawl is in the locked position, and positioned to be disengaged with the bin striker when the latch pawl is in the unlocked position.

3. The latch assembly of claim 1, further comprising:
first and second stop assemblies disposed on the armrest housing, wherein the first stop assembly is adapted to engage the catch mechanism in the non-interference position, and wherein the second stop assembly is adapted to engage the catch mechanism in the interference position.

4. The latch assembly of claim 1, wherein the catch mechanism is disposed adjacent and above the latch pawl and is configured such that the catch mechanism gravitationally rotates downwardly to the interference position to engage the latch pawl.

5. The latch assembly of claim 4, wherein the latch pawl further comprises:
a car-forward end the recess when in the non-interference position.

6. A latch assembly for a vehicle armrest comprising:
a spring-biased latch pawl movable between a locked position and an unlocked position, wherein the spring bias is produced by a first compression spring;
a spring-biased actuator, wherein the spring bias is produced by a second compression spring and moveable in a same direction as the second compression spring, the spring biased actuator being biased by the second compression spring to engage a catch mechanism, wherein the spring biased actuator disengages the catch mechanism when an inertial load is realized on the latch assembly that compresses the second compression spring, and wherein the spring biased latch pawl has a recess receiving the catch mechanism; and
the catch mechanism is operably coupled with the spring-biased actuator and configured to downwardly and gravitationally engage and retain the spring biased latch pawl in the locked position when the spring-biased actuator has been depressed due to an inertial load realized on the spring biased actuator during a rear-end collision event.

7. The latch assembly of claim 6, wherein the spring-biased latch pawl further comprises:
a latch disposed on a car-forward end of the latch pawl, wherein the latch is positioned to be engaged with a bin striker of the armrest when the latch pawl is in the locked position, and positioned to be disengaged with the bin striker when the latch pawl is in the unlocked position.

8. The latch assembly of claim 7, wherein the spring-biased latch pawl comprises a compression spring having an associated compression stiffness, and further wherein the spring-biased actuator comprises a compression spring having an associated compression stiffness that is less than the compression stiffness of the spring-biased latch pawl.

9. The latch assembly of claim 8, wherein, the compression spring of the spring-biased actuator is configured to compress under a lower inertial force as compared to the compression spring of the spring-biased latch pawl during a rear-end collision event such that the catch mechanism engages the latch pawl before the latch pawl can move to the unlocked position.

10. The latch assembly of claim 6, wherein, the spring-biased actuator is moveable between extended and retracted positions, wherein the spring-biased actuator downwardly and gravitationally engages the catch mechanism in the extended position and disengages the catch mechanism in the retracted position.

11. The latch assembly of claim 6, wherein the catch mechanism is rotatably coupled to an armrest housing and is further adapted to pivot between an interference position, wherein the catch mechanism retains the spring-biased latch pawl in the locked position, and a non-interference position, wherein the catch mechanism is disengaged from the spring-biased latch pawl.

12. A latch assembly for a vehicle armrest comprising:
a spring-biased latch pawl operable between a locked position and an unlocked position;
an inertial lockout mechanism disposed above the latch pawl, the inertial lockout mechanism comprising a rocker mechanism gravitationally predisposed to an interference position, such that when the rocker mechanism is in the interference position the rocker mechanism engages and retains the latch pawl in the locked position;
an actuator coupled to a compression spring, the actuator being movable in a same direction as the compression spring and adapted to bias the rocker mechanism to a non-interference position, wherein the compression spring is configured to compress under an inertial load during a collision event such that the rocker mechanism gravitationally pivots to the interference position,
wherein the spring biased pawl has a recess receiving the rocker mechanism when the rocker mechanism is in the interference position.

13. The latch assembly of claim 12, wherein the spring-biased latch pawl further comprises:
a latch disposed on a car-forward end of the latch pawl, wherein the latch is positioned to be engaged with a bin striker of the armrest when the latch pawl is in the locked position, and positioned to be disengaged with the bin striker when the latch pawl is in the unlocked position.

14. The latch assembly of claim 13, wherein the spring-biased latch pawl comprises another compression spring having an associated compression stiffness, and further wherein compression spring coupled to the actuator has an associated compression stiffness that is less than the compression stiffness of the spring-biased latch pawl.

15. The latch assembly of claim 14, wherein, the compression spring coupled to the actuator is configured to compress under a lower inertial force as compared to the another compression spring of the spring-biased latch pawl during a rear-end collision event, such that during a rear-end collision event, the rocker mechanism will gravitationally rotate to the interference position before the spring-biased latch pawl can move to the unlocked position.

16. The latch assembly of claim 12, wherein the inertial lockout mechanism is disposed adjacent and above the spring-biased latch pawl such that the rocker mechanism rotates downwardly to the interference position to engage the spring-biased latch pawl.

* * * * *